United States Patent
Golding et al.

(10) Patent No.: US 9,041,982 B1
(45) Date of Patent: May 26, 2015

(54) PORTABLE DEVICE SCANNER SUPPORT WITH CONTOUR CORRECTION AND AUTOMATIC COPYING

(71) Applicant: XEROX CORPORATION, Norwalk, CT (US)

(72) Inventors: Michael Peter Golding, Ware (GB); Michael John Wilsher, Letchworth (GB); Jack Douglas Jenkins, Jr., Webster, NY (US); Lee Roche, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 38 days.

(21) Appl. No.: 14/082,878

(22) Filed: Nov. 18, 2013

(51) Int. Cl.
　*H04N 1/40*　　　(2006.01)
　*H04N 1/00*　　　(2006.01)
　*H04N 1/10*　　　(2006.01)

(52) U.S. Cl.
　CPC ....... *H04N 1/00541* (2013.01); *H04N 1/00557* (2013.01); *H04N 1/00559* (2013.01); *H04N 1/10* (2013.01); *H04N 2201/0096* (2013.01)

(58) Field of Classification Search
　None
　See application file for complete search history.

(56) References Cited

U.S. PATENT DOCUMENTS

| | | | |
|---|---|---|---|
| 6,540,415 B1 * | 4/2003 | Slatter et al. | 396/428 |
| 7,377,660 B2 | 5/2008 | Izumi | |
| 7,496,454 B2 | 2/2009 | Rogers et al. | |
| 7,624,928 B2 * | 12/2009 | Kimura et al. | 235/494 |
| 8,400,564 B2 | 3/2013 | Jacobs | |
| 8,479,997 B2 | 7/2013 | Barkan et al. | |
| 2006/0066753 A1 | 3/2006 | Gennetten et al. | |
| 2006/0103893 A1 | 5/2006 | Azimi et al. | |
| 2011/0205425 A1 | 8/2011 | Duncan et al. | |
| 2013/0057927 A1 | 3/2013 | Durant et al. | |
| 2013/0075472 A1 | 3/2013 | Collins et al. | |
| 2014/0063519 A1 * | 3/2014 | Amishima | 358/1.13 |

FOREIGN PATENT DOCUMENTS

| | | |
|---|---|---|
| DE | 3600643 | 7/1987 |
| EP | 2 161 489 | 3/2010 |

* cited by examiner

*Primary Examiner* — Steven Kau
(74) *Attorney, Agent, or Firm* — Gibb & Riley, LLC (57) ABSTRACT

Systems and methods use a supporting arm having a first end and a second end, and a program of scanning instructions readable by a computerized processor. The first end of the supporting arm is connected to a secondary device. The second end of the supporting arm holds a portable device comprising a camera. The camera has a field of view within which images are captured. The portable device maintains the scanning instructions. The second end of the supporting arm is positioned to hold the camera in a location, relative to the secondary device, to maintain the surface of the secondary device within the field of view of the camera. The camera of the portable device obtains images of objects placed on the surface of the secondary device when the portable device is held by the portable device holder.

20 Claims, 10 Drawing Sheets

PORTABLE DEVICE SCANNER SUPPORT WITH CONTOUR CORRECTION AND AUTOMATIC COPYING

BACKGROUND

Systems and methods herein generally relate to using portable devices as scanners and more particularly to using items such as smartphones, tablet computers, etc. as scanners.

Low-end printing devices often have very limited capabilities and many such devices do not include the ability to scan or copy. However, the ever more available smartphone and tablet computer almost always include a camera, graphic user interface, and processor as standard equipment.

SUMMARY

Exemplary systems herein comprise a supporting arm having a first end and a second end, and a program of scanning instructions readable by a computerized processor. The first end of the support arm comprises a surface connector (such as a biased clamp, permanent physical connections, etc.) and the surface connector is sized and shaped to connect to a secondary device. The second end of the support arm comprises a portable device holder (such as a biased clamp, a slotted frame, etc.) and the portable device holder is sized and shaped to hold a portable device comprising a camera (such as a smart phone, a personal digital assistant, a tablet computer, a stand-alone digital camera, etc.).

The camera has a field of view within which images are captured. The portable device maintains the scanning instructions. The second end of the support arm is positioned to hold the camera in a location, relative to the secondary device, to maintain the surface of the secondary device within the field of view of the camera. The camera of the portable device obtains images of objects placed on the surface of the secondary device when the portable device is held by the portable device holder.

The scanning instructions cause the processor of the portable device to automatically correct distortions of the images of the objects placed on the surface of the secondary device to generate undistorted and formatted images of the objects. Such undistorted and formatted images contain the objects appearing as laid flat on the surface.

The scanning instructions can also be copying instructions that cause the processor to automatically forward the undistorted and formatted images of the objects to the printer device. Further, such copying instructions cause the printing device to automatically print the undistorted images of the objects.

Various methods herein connect a first end of a support arm to a secondary device using a surface connector of the first end of the support arm. Also, such methods connect a second end of the support arm to a portable device using a portable device holder of the second end of the support arm. The portable device holder is sized and shaped to hold the portable device. The portable device has a camera, and these methods position the second end of the support arm to hold the camera in a location, relative to the secondary device, to maintain a surface of the secondary device within a field of view of the camera. The portable device maintains a program of scanning instructions readable by a computerized processor. These methods obtain images of objects placed on the surface of the secondary device using the camera of the portable device when the portable device is held by the portable device holder.

Also, such methods automatically correct distortions and format of the images of the objects placed on the surface of the printer using the scanning/copying instructions (executed by a processor of the portable device) to generate undistorted and formatted images of the objects.

Again, if the scanning instructions are also copying instructions, these methods cause the processor to automatically forward the undistorted and formatted images of the objects to the printer device. Further, with such copying instructions, these methods cause the printing device to automatically print the undistorted and formatted images of the objects.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, commonly available smartphones and tablet computers almost always include a camera, graphic user interface, and processor as standard equipment; however, low-end printers often do not include a scanning or copying capability. In view of this, the systems and methods herein provide a lightweight, easy to use, easy to store, stable, portable device holder and associated program of computer readable instructions that utilize the functionality of any portable device having a camera to provide a scanning and copying function to a low-end printing device.

Figure 1:
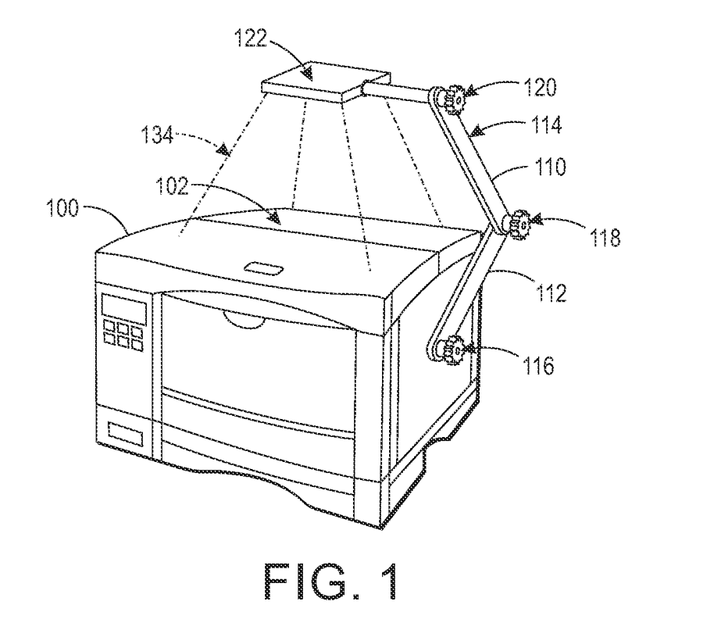
FIG. 1 is a schematic diagram illustrating devices herein.

As shown in FIG. 1, exemplary systems herein comprise a folding support arm 110 having a first end 112 and a second end 114. For example, the support arm 110 can comprise a single section or multiple sections connected together by one or more hinges 118, 120 having wingnuts or twist handles that can be tightened and loosened by hand to adjust the relative angle of the different sections of the support arm 110. This allows the support arm 110 to be collapsed (folded) when not needed, yet easily unfolded when needed for scanning or copying.

The first end 112 of the support arm 110 comprises a surface connector 116 (such as a biased clamp (such as that shown in FIG. 3) or permanent physical connections (such as screws, rivets, bolts, etc.), etc.) and the surface connector 116 is sized and shaped to connect to a secondary device 100 (such as a printing device having an upper surface 102 upon which items can be placed for scanning).

The second end 114 of the support arm 110 comprises a portable device holder 122 (such as a slotted frame 122A shown in FIG. 2, a biased clamp 122B biased by a spring 140, shown in FIG. 3, etc.) and the portable device holder 122 is sized and shaped to hold a portable device 130 (illustrated in FIGS. 2 and 3) such as a smartphone, a personal digital assistant, a tablet computer, a stand-alone digital camera, etc. The portable device 130 includes a camera 132. The camera 132 has a field of view 134 within which images are captured.

The portable device 130 maintains scanning instructions as part of the systems herein, and such scanning instructions are readable and executable by a computerized processor. Such scanning instructions can be loaded onto the portable device 130 when the portable device is connected (wired or wirelessly) to the secondary device or to another computerized device. For example, the scanning instructions can be downloaded by the portable device from a network server, from a local computer, from the printer itself, etc., using wired or wireless connections. Once downloaded, the portable device 130 can maintain the scanning instructions permanently.

The second end 114 of the support arm 110 is positioned to hold the camera 132 in a location, relative to the secondary device 100, to maintain the surface of the secondary device 100 within the field of view 134 of the camera 132. The camera 132 of the portable device 130 obtains images of objects placed on the surface 102 of the secondary device 100 as the portable device holder 122 holds the portable device 130.

Figure 4:
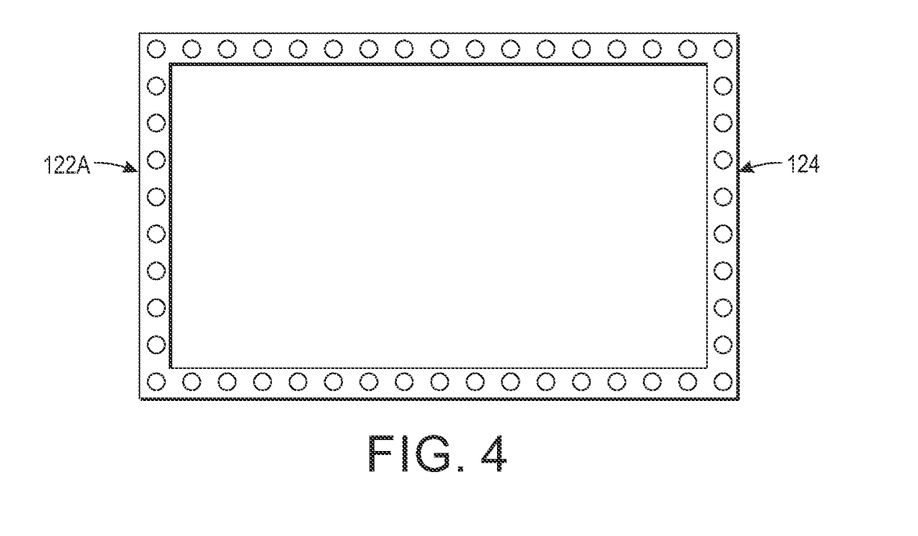
FIG. 4 is a schematic diagram illustrating devices herein.

To aid in the scanning process (and to optionally, in addition display a pattern of lines or dots on the object being scanned on the surface 102 of the secondary device 100, as discussed in greater detail below) lighting elements 124, FIG. 4, can be included along the surface of the portable device holder 122A that faces the surface 102 of the secondary device 100. These lighting elements 124 can be any element that emits light, whether currently known or developed in the future.

Figure 5:
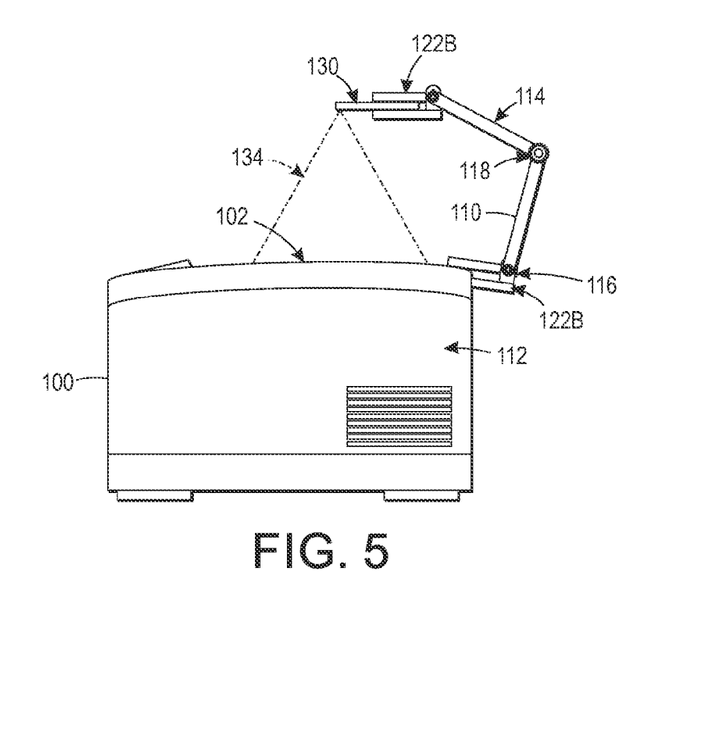
FIG. 5 is a schematic diagram illustrating devices herein.
Figure 6:
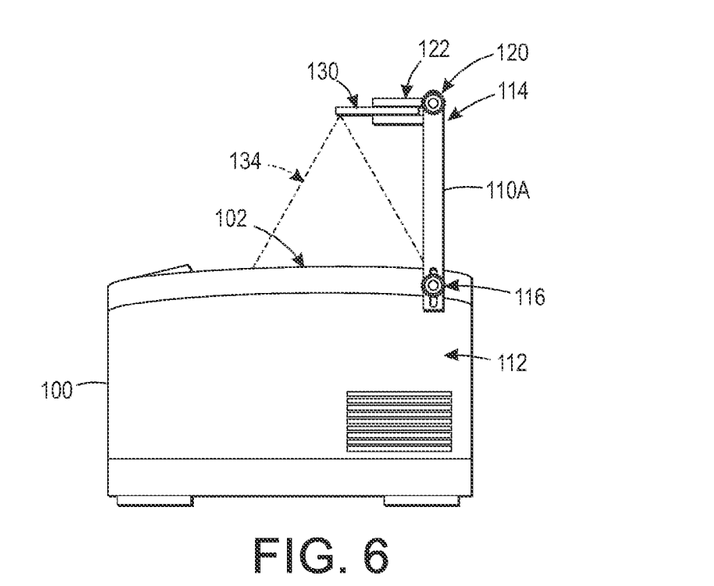
FIG. 6 is a schematic diagram illustrating devices herein.
Figure 7:
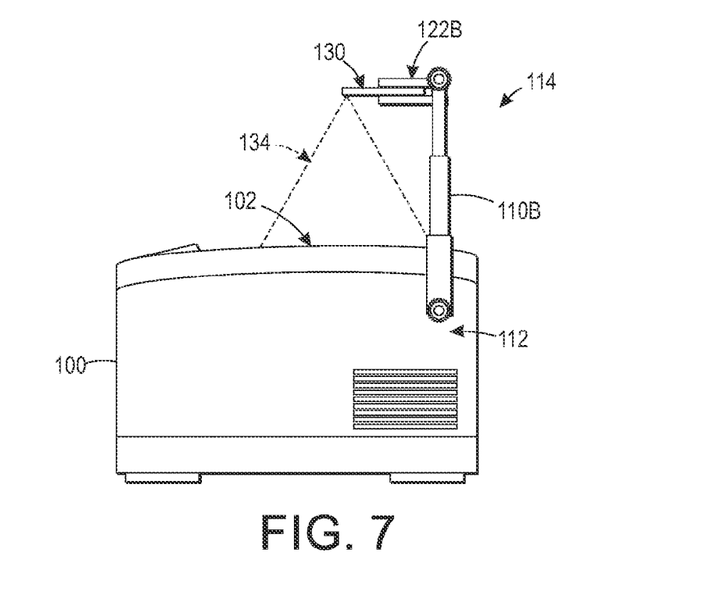
FIG. 7 is a schematic diagram illustrating devices herein.
Figure 8:
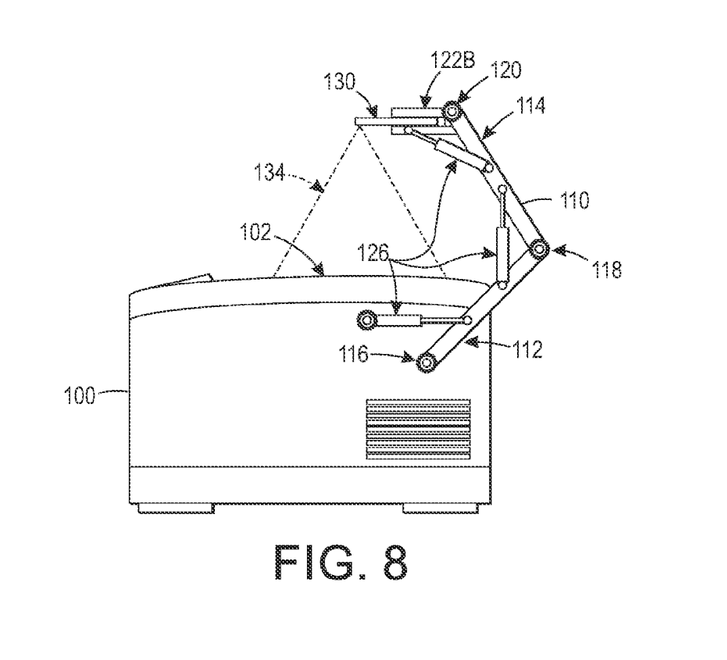
FIG. 8 is a schematic diagram illustrating devices herein.

FIG. 5 illustrates the biased clamp 122B version of the portable device holder 122. As can be seen in FIG. 5, the support arm 110 clamps to the secondary device 100 and also clamps to the portable device 130. FIG. 6 illustrates an alternative support arm 110A that comprises a single continuous material. The support arm 110A in FIG. 6 can be formed of a flexible material (such as a coated flexible metal or plastic) or of a rigid material that merely pivots about the surface connector 116. FIG. 7 illustrates a support arm 110B that comprises a telescoping pole as yet another alternative structure. FIG. 8 illustrates gas struts, springs, or similar structures 126 that help support the arm 110 and that aid the user in moving and positioning the support arm 110.

The scanning instructions provided to the portable device 130 cause the processor of the portable device 130 to automatically correct distortions and format of the images of the objects placed on the surface of the secondary device 100 to generate undistorted images of the objects. Such undistorted images contain the objects appearing as laid flat on the surface.

As can be seen in the above drawings, the portable device 130 (e.g., tablet/smartphone) is supported above the printer top 102. Images to be scanned are placed on the printer top 102 and the rear camera 132 on the portable device 130 is used to take the image. The image is then processed by the portable device 130 and sent to the printer for printing, or other destination via a wired or wireless connection (such as Bluetooth, WiFi, USB or other suitable link).

Figure 9:
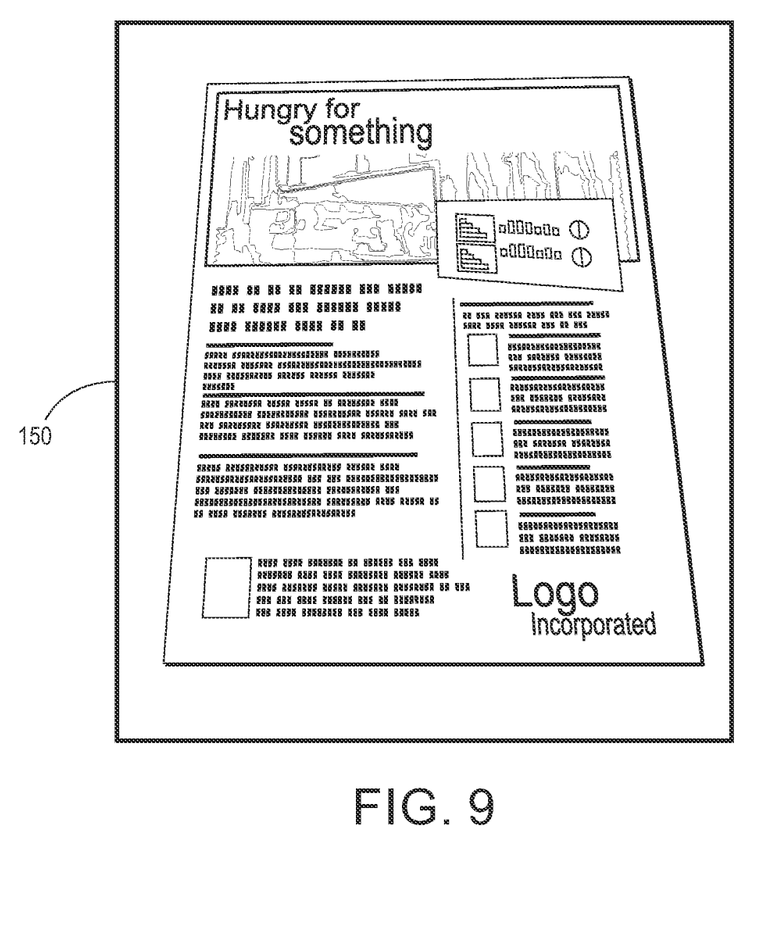
FIG. 9 is a schematic diagram illustrating images processed by methods and systems herein.

Systems and methods herein also provide additional processing to address defects that are inherent in the quality of the captured image. For example, FIG. 9 illustrates a typical raw scan 150 illustrating issues that need to be addressed to produce a useable copy. Such issues with the raw scan 150 shown in FIG. 9 include non-uniform illumination, white balance, corner detection, perspective distortion, original size, etc.

With respect to non-uniform illumination, systems and methods herein correct the illumination in the original image coordinates. For example, systems and methods herein take a calibration image of the background and map this image to a uniform value. One such available reference background is the printer top.

Figure 10:
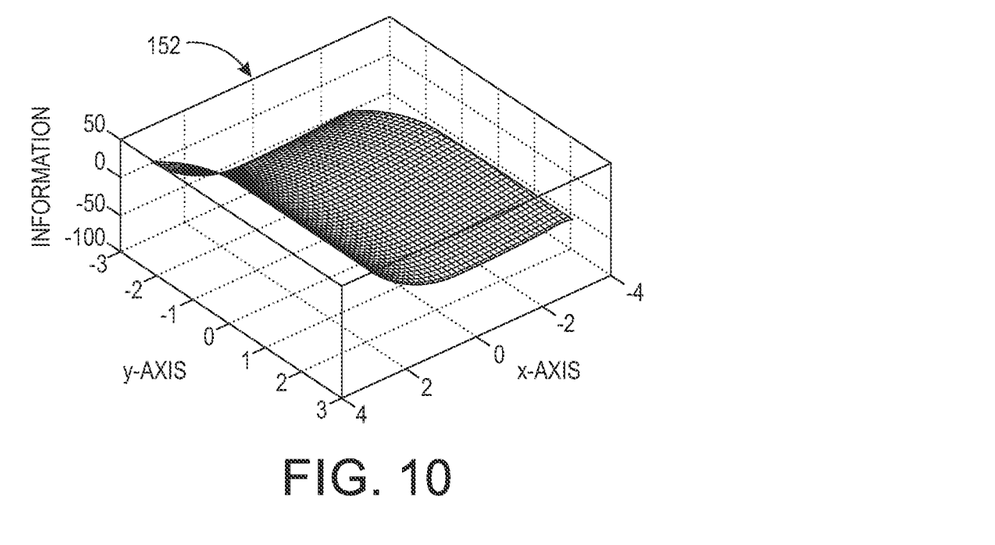
FIG. 10 is a graph illustrating processing performed by methods and systems herein.
Figure 11:
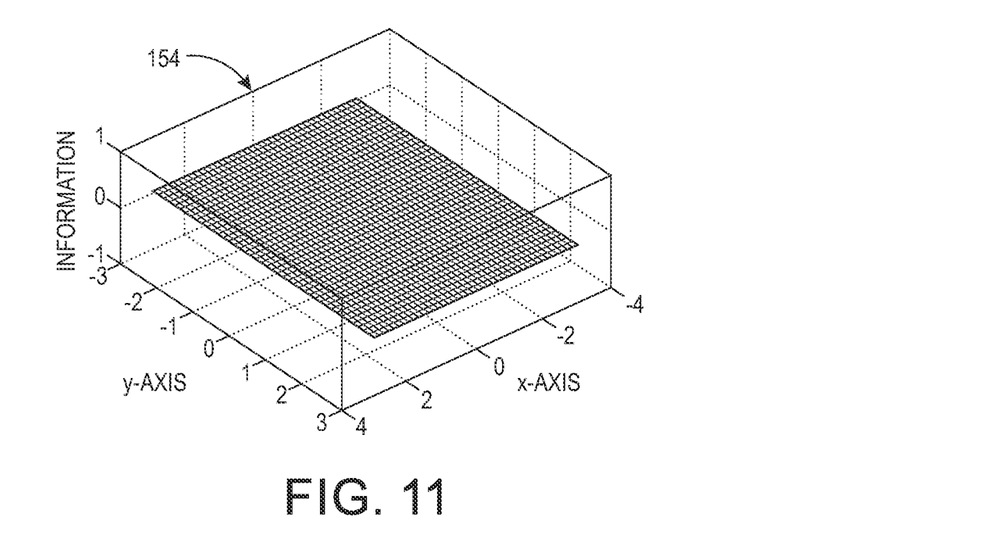
FIG. 11 is a graph illustrating processing performed by methods and systems herein.

FIGS. 10 and 11 illustrate non-uniform illumination 152 (FIG. 10) and the same image corrected to have uniform illumination 154 (FIG. 11). Systems and methods perform this correction processing where, for each point in the original image of a uniform background, the correction factor is: Uniform value/Pixel (x,y). This correction is applied pixel by pixel to the original image. Illumination can be corrected pixel by pixel as illustrated above or systems and methods herein can fit a surface equation to the original image $Z=f(x, y)$. Thus, systems and methods herein can use the surface equation to determine the illumination correction. This illumination correction process also smoothes noise in the original.

With respect to issue of white balance, in color images it is desirable to balance the white in the image. This can be done in the uniform illumination process shown in FIGS. 10 and 11 by determining the correction individually for the red, green, and blue (R, G and B) channels and correcting to the desired RGB white balance value, e.g., known target value for calibration target image.

Figure 12:
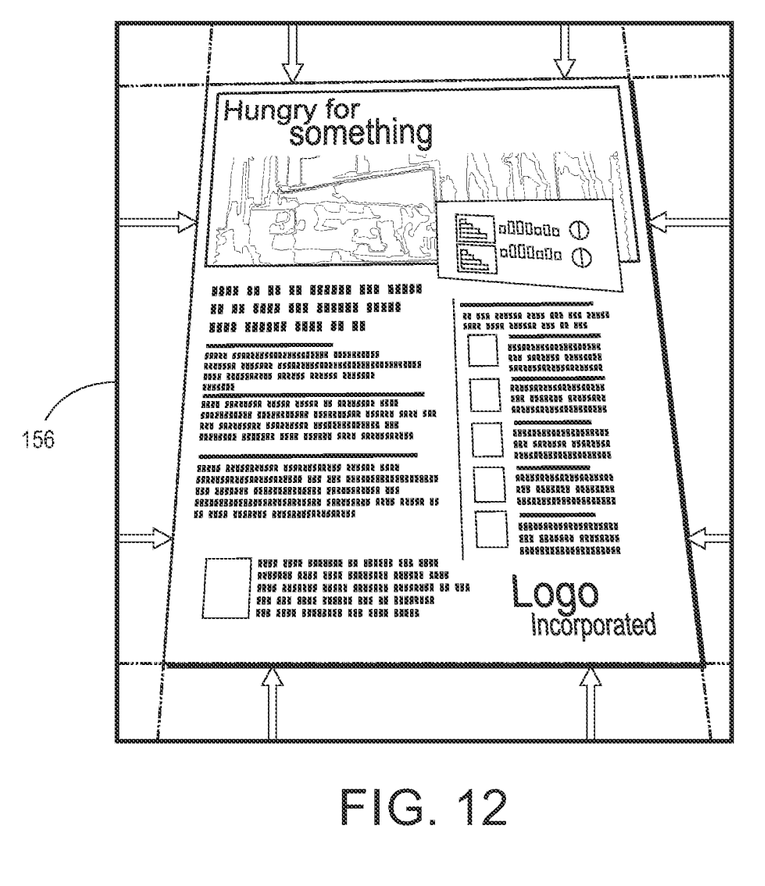
FIG. 12 is a schematic diagram illustrating images processed by methods and systems herein.

With respect to corner detection, as shown by item 156 in FIG. 12, the corners of the image can be found by many methods, one of which tracks in from the edge of the image at two points along each edge until a transition is found then extending the corresponding lines and finding the crossing points.

Perspective distortion is also removed by methods and systems herein. From the processing shown in FIG. 12, the original image corners are known, and they can be translated by systems and methods herein into a set of defined coordinates removing any perspective induced by the camera lens and positioning of the image relative to the camera. This also corrects any skew/rotation and alignment and can be implemented in a matrix transformation from one coordinate system to the other.

With respect to the issue of original size, typically the portable device 130 used is known and the holder is a set distance from the surface. Thus, from the original coordinates of the corners, systems and methods herein determine the original size and use this as an input to the printer to print the image on the correct paper. Further, systems and methods herein can scale the image to the default paper size or as part of the calibration for uniformity a known etched/preprinted grid (discussed below) can be scanned such that the setup knows the image size. The etched/preprinted grid is used for sizing, as opposed to contour removal. Therefore the two concepts are divided in this disclosure.

An image of a grid can be projected by the portable device 130 or by lights 124 in the portable device holder 122. For example, in some devices, the lights 124 are flood lights covered with a filter that causes a grid or line pattern to be displayed. A similar filter can be used with the light on the portable device used to produce a picture flash. Alternatively, if the lights 124 or portable device light is used to illuminate the object being photographed, such a filter can be only connected to either the lights 124 or the portable device light. In other alternatives the lights 124 comprise lights capable of producing a pattern (e.g., such as lasers, etc.).

Figure 13:
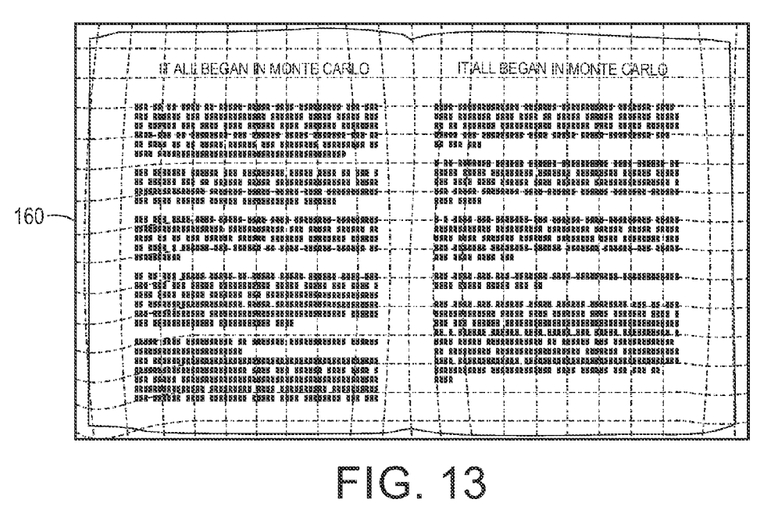
FIG. 13 is a schematic diagram illustrating images processed by methods and systems herein.

Thus, the scanning instructions can cause the portable device 130 or lights 124 to display a grid on the objects when obtaining images of the objects, so as to obtain images of grid covered objects, as shown for example as item 160 in FIG. 13. When automatically correcting distortions, the scanning instructions cause the processor to use the images of grid-covered objects to determine the amount of distortion within the images of the objects.

Figure 14:
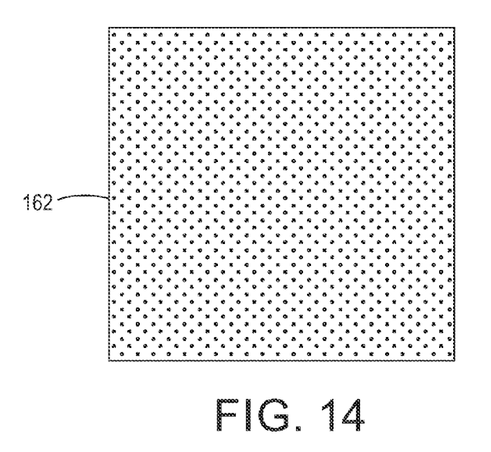
FIG. 14 is a schematic diagram illustrating images processed by methods and systems herein.

The grid pattern shown in item 160 can be generated with a laser and diffraction grating, and can be a full line grid or just a series of dots (as shown in item 162 in FIG. 14). When the grid pattern in FIG. 13 and the grid pattern in FIG. 14 are projected over on object, the pattern spreads out from the source so the spacing of the grid or dots is indicative of the distance of the object from the camera. The resolution of the grid or dots determines the accuracy to which the correction can be made. As mentioned above, the systems and methods herein fit a function to the surface, which smoothes out any slight discrepancies and noise in the image.

Further, systems and methods herein then map from the actual grid to the reference image. The systems and methods herein can only map from the grid on the image to a perfect notional grid, and can avoid going through the intermediate grid on the printer surface, as this will still have the camera and printer top distortions included.

To avoid chances of eye damage, the systems and methods herein monitor the target image and only power the laser grid 124 when there is no motion in the field of view 134 of the camera 132. Secondly the gird/dots are only flashed for a short time (e.g., 0.5 sec.) that is needed to extract the image contours.

Figure 15:
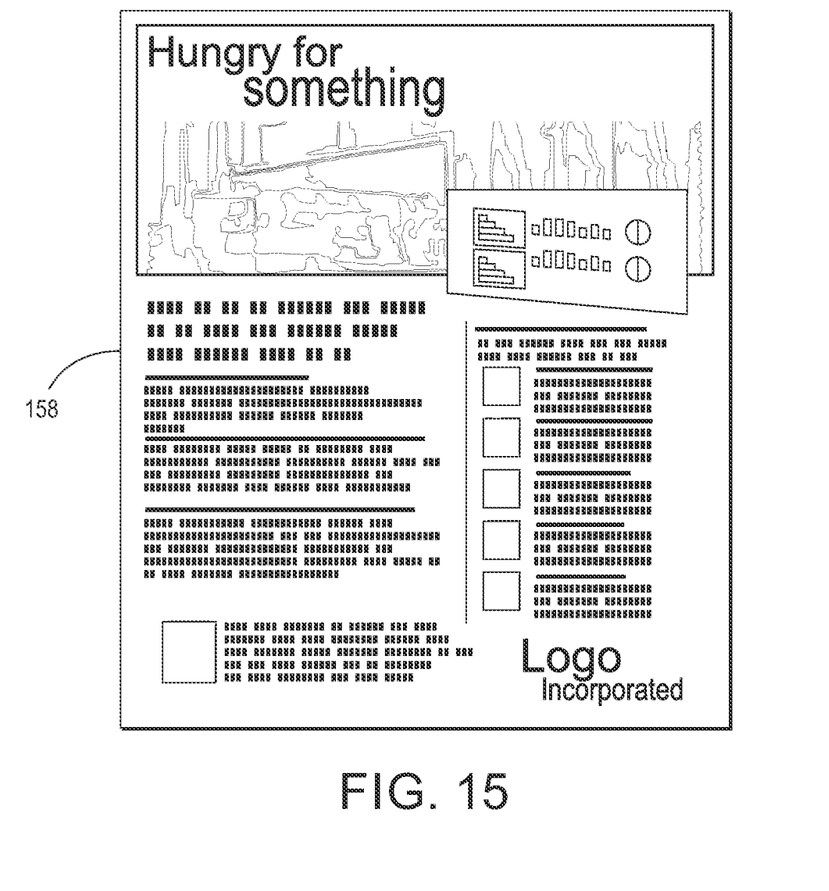
FIG. 15 is a schematic diagram illustrating images processed by methods and systems herein.

Further, to avoid blurry scans, the systems and methods herein can take multiple pictures of an object and select the least blurry image, or only take an image when several consecutive frames have a stable image. The resultant corrected image 158 is shown in FIG. 15, which can be processed with the normal copier processing, even taking into account things such as text enhancement, graphics and image detection, and processing to obtain the final result.

Therefore, the systems and methods herein perform many phases. In the calibration phase, with a clear platen and no motion, the systems and methods herein capture a reference image. In the image phase, an object is placed on the surface 102 and the user starts the application having the scanning/copying instructions on the portable device 130 (through a graphic user interface standard to all such portable devices). The scanning/copying instructions display various menu options on the portable device 130 graphic user interface. The user then selects a desired menu option on the graphic user interface of the portable device 130.

In response to the menu option selection by the user, the scanning/copying instructions cause the camera 132 to take multiple images within a short time (e.g., within 2-10 seconds, or less). The scanning/copying instructions cause the processor of the portable device 130 to determine if any motion is present. The scanning/copying instructions cause the processor of the portable device 130 to optionally display a user message if motion is present or indicate a successful image capture.

Once the processor determines that there is no motion, the scanning/copying instructions cause the camera of the portable device 130 to acquire an original image (with or without illumination aid provided by the light of the portable device 130 or the lights 124 of the portable device holder 122). Further, the scanning/copying instructions cause the portable device 130 or the lights 124 to briefly display to grid or dot pattern and cause the camera 132 to acquire a second contour image. For this purpose, the portable device can be in wired or wireless communication with the lights 124 of the portable device holder 122 to cause them to display the grid/dot pattern, or the portable device 130 can use its own display capability to display the grid/dot pattern.

The scanning/copying instructions cause the processor of the portable device 130 to invert a contour map back to the reference grid and the smoothed de-warp calculation is applied to the original image. Further, as discussed above, the scanning/copying instructions cause the processor of the portable device 130 to perform other processing steps such as non-uniform illumination correction, white balance, subject corner detection, perspective distortion correction, original size determination, etc.

In one example, the systems and methods provide an automatic book copy process. More specifically, the scanning instructions can also be copying instructions that cause the processor to automatically forward the processed undistorted images of the objects to the printer device (again, through wired or wireless connections). Further, such copying instructions cause the printing device to automatically print the undistorted images of the objects, without requiring the user to provide any printing instructions or commands to the printer.

With respect to book copying, scanning/copying instructions cause the portable device 130 to instruct the user when to turn a page (through the graphic user interface) and to detect motion when pages are turned (using the camera). Further, the scanning/copying instructions cause the processor of the portable device 130 to identify the still periods between page turns, and to take the contour compensation image and the book image in these still periods making up a copy of the book. For example, the scanning/copying instructions can cause a speaker or the graphic user interface of the portable device 130 to produce a simple signal after each page is captured to signal the user to turn to the next page, and optionally a different signal to signify that the page capture is in progress. When the book is finished the user simply selects a finish menu selection option on the graphic user interface. With the book facing up and the automatic motion detection and image capture this method provides an extremely easy method of copying the book with minimal user intervention.

Further robustness is added because the scanning/copying instructions cause the processor of the portable device 130 to check for duplicate pages by post-processing the images and looking for duplicates in the image stream. The scanning/copying instructions cause the processor of the portable device 130 to optionally delete duplicate pages before printing or saving the finished book.

Figure 16:
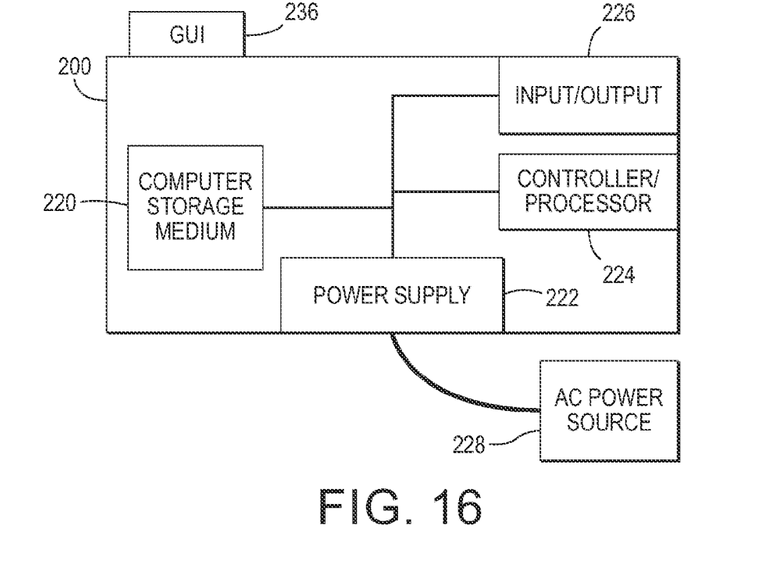
FIG. 16 is a schematic diagram illustrating devices herein.

FIG. 16 illustrates a computerized device 200, which can be used with systems and methods herein and can comprise, for example, a personal computer, a portable computing device, etc. The computerized device 200 includes a controller/processor 224 and a wired/wireless communications port (input/output) 226 operatively connected to the processor 224 and to the devices discussed above that are external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 16, a body housing 200 has one or more functional components that operate on power supplied from an alternating current (AC) source 228 by the power supply 222. The power supply 222 can comprise a power storage element (e.g., a battery, etc).

Figure 17:
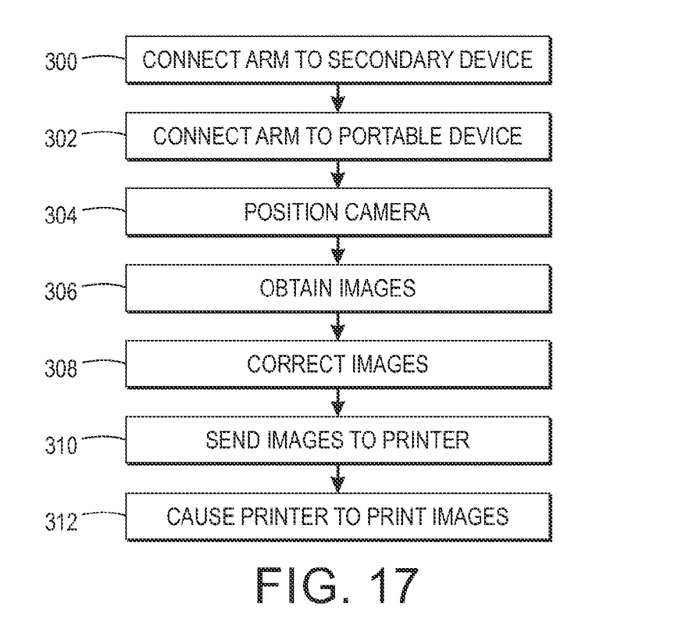
FIG. 17 is a flow diagram of various methods herein.

FIG. 17 is flowchart illustrating exemplary methods herein. In item 300, these methods connect (or extend) a first end of a support arm to a secondary device using a surface connector of the first end of the support arm. Also, in item 302, such methods connect a second end of the support arm to a portable device using a portable device holder of the second end of the support arm.

Figure 2:
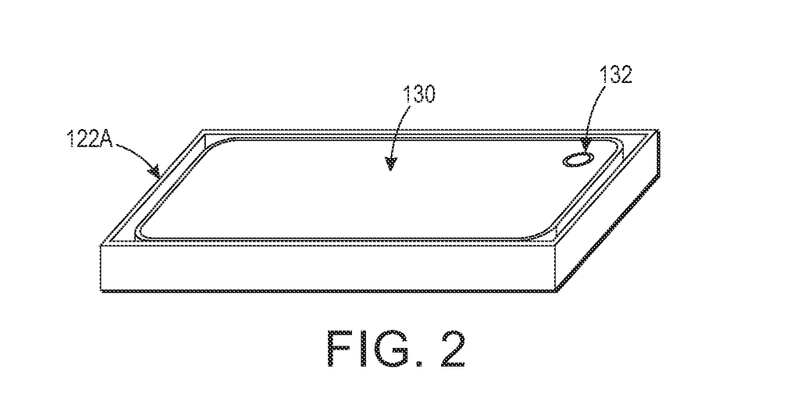
FIG. 2 is a schematic diagram illustrating devices herein.
Figure 3:
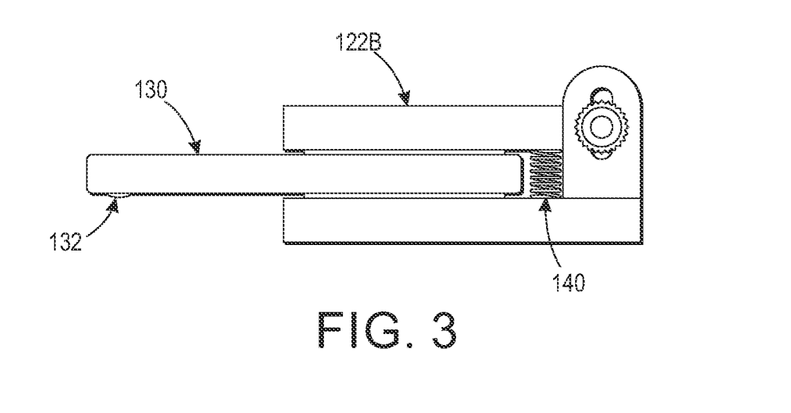
FIG. 3 is a schematic diagram illustrating devices herein.

As shown in FIGS. 2 and 3 discussed above, the portable device holder is sized and shaped to hold the portable device. The portable device has a camera, and in item 304, these methods position the second end of the support arm to hold the camera in a location, relative to the secondary device, to maintain a surface of the secondary device within a field of view of the camera. The portable device maintains a program of scanning instructions readable by a computerized processor. In item 306, these methods obtain one or more images of objects placed on the surface of the secondary device using the camera of the portable device when the portable device is held by the portable device holder.

Also, in item 308, such methods automatically correct distortions and format of the images of the objects placed on the surface of the printer using the scanning/copying instructions (executed by a processor of the portable device) to generate undistorted images of the objects (as discussed above). As noted above, during the process of obtaining images of the objects in item 306, these methods can cause the portable device to display a grid on the objects (using the scanning/copying instructions executed by the processor of the portable device) to obtain images of grid covered objects. Thus, when automatically correcting distortions in item 308, such methods use the images of grid covered objects to determine the amount of angular distortion within the images of the objects.

Again, if the scanning instructions are also copying instructions, these methods cause the processor to automatically forward the undistorted images of the objects to the printer device in item 310. Further, with such copying instructions, these methods cause the printing device to automatically print the undistorted images of the objects in item 312. The system and methods herein are not limited to just printing and copying, but can also be used with scanning and sharing technologies.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, or simply a passive support table etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims Unless specifically defined in a specific claim itself, steps or components of the systems and methods herein cannot be implied or imported from any above example as limitations to any particular order, number, position, size, shape, angle, color, or material.

What is claimed is:

1. A system comprising:
    a support arm having a first end and a second end; and
    a program of scanning instructions readable by a computerized processor,
    said first end of said support arm comprising a surface connector, said surface connector being sized and shaped to connect to a secondary device, said second end of said support arm comprising a portable device holder, said portable device holder being sized and shaped to hold a portable device comprising a camera, said camera having a field of view within which images are captured, said portable device maintaining said scanning instructions, said second end of said support arm being positioned to hold said camera in a location, relative to said secondary device, to maintain a surface of said secondary device within said field of view of said camera, said camera of said portable device obtaining images of objects placed on said surface of said secondary device when said portable device is held by said portable device holder, and said scanning instructions causing a processor of said portable device to automatically correct distortions of said images of said objects placed on said surface of said secondary device to generate undistorted images of said objects.

2. The system according to claim 1, said portable device holder comprising one of a biased clamp and a slotted frame holding said portable device.

3. The system according to claim 1, said surface connector comprising one of a biased clamp and permanent physical connections.

4. The system according to claim 1, said scanning instructions causing said portable device to display a grid on said objects to obtain images of grid covered objects.

5. The system according to claim 4, said causing said processor of said portable device to automatically correct distortions uses said images of grid covered objects to determine an amount of angular distortion within said images of said objects for distortion correction.

6. The system according to claim 1, said portable device comprising one of a smart phone, a personal digital assistant, a tablet computer, and a stand-alone digital camera.

7. The system according to claim 1, said undistorted images containing said objects appearing as laid flat on said surface.

8. A system comprising:

a support arm having a first end and a second end; and a program of copying instructions readable by a computerized processor, said first end of said support arm comprising a surface connector, said surface connector being sized and shaped to connect to a printer device, said second end of said support arm comprising a portable device holder, said portable device holder being sized and shaped to hold a portable device comprising a camera, said camera having a field of view within which images are captured, said portable device and said printer device maintaining said copying instructions, said second end of said support arm being positioned to hold said camera in a location, relative to said printer device, to maintain a surface of said printer device within said field of view of said camera, said camera of said portable device obtaining images of objects placed on said surface of said printer device when said portable device is held by said portable device holder, said copying instructions causing a processor of said portable device to automatically correct distortions of said images of said objects placed on said surface of said printer device to generate undistorted images of said objects, said copying instructions causing said processor to forward said undistorted images of said objects to said printer device, and said copying instructions causing said printer device to print said undistorted images of said objects.

9. The system according to claim 8, said portable device holder comprising one of a biased clamp and a slotted frame holding said portable device.

10. The system according to claim 8, said surface connector comprising one of a biased clamp and permanent physical connections.

11. The system according to claim 8, said copying instructions causing said portable device to display a grid on said objects to obtain images of grid covered objects.

12. The system according to claim 11, said causing said processor of said portable device to automatically correct distortions uses said images of grid covered objects to determine an amount of angular distortion within said images of said objects for distortion correction.

13. The system according to claim 8, said portable device comprising one of a smart phone, a personal digital assistant, a tablet computer, and a stand-alone digital camera.

14. The system according to claim 8, said undistorted images containing said objects appearing as laid flat on said surface.

15. A method comprising:

connecting a first end of a support arm to a secondary device using a surface connector of said first end of said support arm;

connecting a second end of said support arm to a portable device using a portable device holder of said second end of said support arm, said portable device holder being sized and shaped to hold said portable device, said portable device comprising a camera;

positioning said second end of said support arm to hold said camera in a location, relative to said secondary device, to maintain a surface of said secondary device within a field of view of said camera, said portable device maintaining a program of scanning instructions readable by a computerized processor;

obtaining images of objects placed on said surface of said secondary device using said camera of said portable device when said portable device is held by said portable device holder; and automatically correcting distortions of said images of said objects placed on said surface of said printer using said scanning instructions executed by a processor of said portable device to generate undistorted images of said objects.

16. The method according to claim 15, said connecting said second end of said support arm to said portable device comprising using one of a biased clamp and a slotted frame to hold said portable device.

17. The method according to claim 15, said connecting said first end of said support arm to said secondary device comprising using one of a biased clamp and permanent physical connections.

18. The method according to claim 15, further comprising causing said portable device to display a grid on said objects during said obtaining images of said objects using said scanning instructions executed by said processor of said portable device to obtain images of grid covered objects.

19. The method according to claim 18, said automatically correcting distortions using said images of grid covered objects to determine an amount of angular distortion within said images of said objects.

20. The method according to claim 15, said undistorted images containing said objects appearing as laid flat on said surface.

* * * * *